United States Patent [19]

Goetz et al.

[11] Patent Number: 4,561,620
[45] Date of Patent: Dec. 31, 1985

[54] TILTABLE CATHODE RAY TUBE DISPLAY DEVICE STRUCTURE

[75] Inventors: Fred E. Goetz; Jim C. Harris, both of Boca Raton; Steven E. Howell, Lantana, all of Fla.

[73] Assignee: International Business Machines Corp., Armonk, N.Y.

[21] Appl. No.: 604,683

[22] Filed: May 3, 1984

[51] Int. Cl.⁴ .................................................. A47G 29/00
[52] U.S. Cl. .................................... 248/371; 248/185
[58] Field of Search .............. 248/349, 183, 184, 179, 248/371, 663, 649, 139, 397, 398, 185; 179/2 TV

[56] References Cited

U.S. PATENT DOCUMENTS

| | | | |
|---|---|---|---|
| 2,796,226 | 6/1957 | Dalton et al. | 248/183 |
| 3,603,545 | 9/1971 | Boniface | 248/371 X |
| 3,970,792 | 7/1976 | Benham | 248/183 X |
| 4,410,159 | 10/1983 | McVicker | 248/349 |

FOREIGN PATENT DOCUMENTS

| | | | |
|---|---|---|---|
| 699104 | 2/1931 | France | 74/422 |
| 86652 | 5/1982 | Japan | 74/422 |

Primary Examiner—J. Franklin Foss
Attorney, Agent, or Firm—Robert Lieber

[57] ABSTRACT

In a CRT display device system, an upper assembly, including the display device, is tiltable on a supporting base assembly. A gear segment at each end of the upper assembly rests on a pair of pinions on the base assembly. The radius of curvature of each gear segment is centered on a horizontal line passing across the display device and through or near the center of gravity of the upper assembly. As the upper assembly is tilted, it pivots about this line and therefore remains substantially in balance for all angles of tilt. To provide static rest pressure to prevent unwanted tilting movement and also to minimize backlash, the pinions in each pair are coupled together through an idler pinion.

4 Claims, 4 Drawing Figures

TILTABLE CATHODE RAY TUBE DISPLAY DEVICE STRUCTURE

FIELD OF THE INVENTION

The present invention relates to cathode ray tube display devices and in particular to means for adjustably tilting such devices in order to minimise glare and reflections from internal lighting on the screen.

BACKGROUND ART

Many cathode ray tube display devices incorporate adjustable tilting arrangements. These vary from the simplest type in which arms extending below the upper assembly are mounted on arms extending upwardly from the base assembly by means of a pivot pin. Such systems normally require a locking device to allow free tilting movement when unlocked and no such movement when locked. Another system is similar to the camera type ball and socket system, which also requires a locking mechanism. Other systems rely on the friction of sliding contacts between the upper and base assemblies to allow movement but to prevent unwanted movement when the screen is in the desired position. Such systems, which are exemplified by the display unit of the Displaywriter system manufactured by International Business Machines Corporation, are effective but are subject to wear.

It is, therefore, an object to the present invention to provide a tilting mechanism for a cathode ray tube display device which is easily adjusted and does not rely on sliding contacts or locking mechanisms to maintain the device in the desired position.

SUMMARY OF THE INVENTION

In accordance with the invention, a tiltable cathode ray tube display device assembly comprises an upper tiltable unit mounted on a non-tiltable stand which may, however, be rotatable. The mounting arrangement comprises a gear mechanism which allows the upper unit to tilt about a line passing through or near its center of gravity. Thus, as the upper unit is tilted it remains substantially in balance. The gear mechanism includes a pair of gear segments which extend below the upper unit, the segments being positioned near the sides of this unit. Each segment is supported on a pair of pinions to allow smooth rotation of the segments as the upper unit is tilted. The pitch radius of the segments is centered on a line across the upper unit passing through or near the center of gravity of this unit.

DETAILED DESCRIPTION OF AN EMBODIMENT OF THE INVENTION

Figure 1:
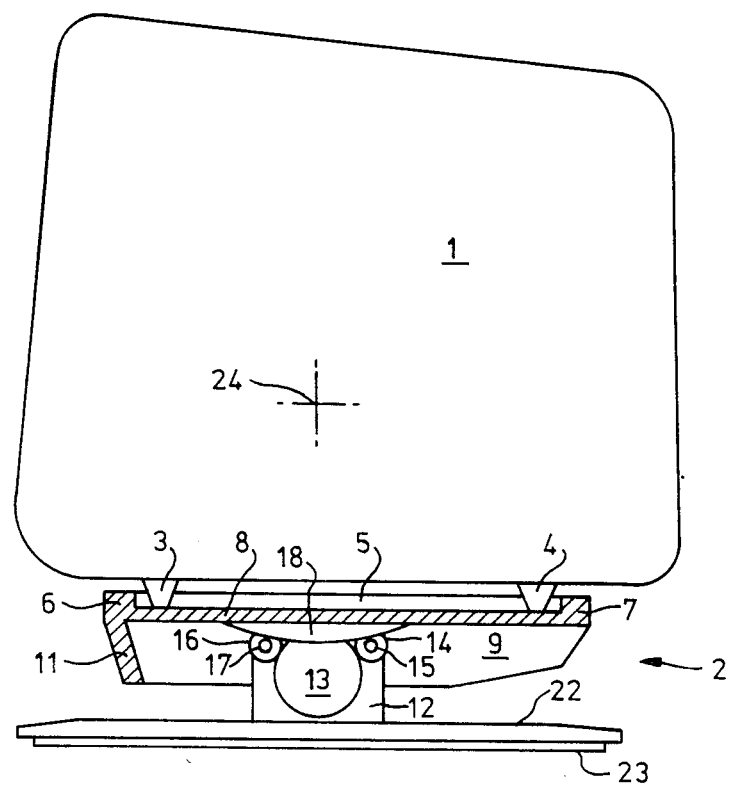
FIG. 1 is a side view of a CRT display unit mounted on a stand incorporating a tilt mechanism embodying the invention.
Figure 2:
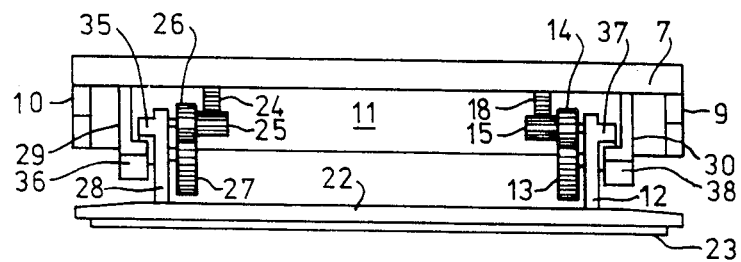
FIG. 2 is a rear view of the stand shown in FIG. 1.

FIG. 1 shows, in side elevation, a CRT display unit 1 mounted on a stand 2. FIG. 2 is a rear view of the stand, that is as viewed from right to left in FIG. 1. Stand 2 is arranged to tilt and swivel to present an optimum CRT screen position to an operator. Feet 3 and 4 of the display unit fit within a tray in the stand defined by a pair of side walls (only one of which, 5, is shown in FIG. 1), a front wall 6, a rear wall 7 and a floor 8. Side skirts 9 and 10 extend below the side walls, and a front skirt 11 extends below front wall 6. These skirts merely hide the tilt mechanism to improve the appearance of the stand. In order to reveal details of the tilt mechanism, the front and rear walls, floor, and front skirt have been sectioned in FIG. 1 to remove the side wall 10 shown in FIG. 2.

Figure 3:
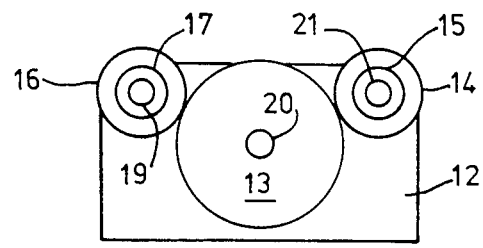
FIG. 3 shows a portion of the tilt mechanism in FIG. 1 in more detail.

Referring now to FIGS. 1, 2 and 3 together, a pair of gear segments 18 and 24 are mounted on the under surface of floor 18. These are positioned directly below a horizontal line passing directly across display unit 1 and through, or near, the center of gravity of the combination of the display unit and the tilting portion of the stand, that is, the tray and skirts. The position of this line is shown at 24 in FIG. 1. The radius of curvature of each of segments 18 and 24 is centered at the point on the line directly above the segment.

Gear segment 18 engages, and is supported by, a pair of pinions 15 and 17, which, as can be seen in detail in FIG. 3, are mounted on respective axles 21 and 19. These axles are rigidly affixed to a support plate 12 which is itself mounted on an upper base plate 22. Pinions 15 and 19 are fixed to larger pinions 14 and 16 and each of these pairs freely rotates about its respective axle. Pinions 14 and 16 engage a larger pinion 13 which is freely rotatable on an axle 20, also mounted on support plate 12. As can be seen in FIG. 2, gear segment 24 is supported by a similar assembly comprising a support plate 28, pinion pair 25 and 26, a further similar pinion pair which is not visible in this figure, and pinion 27.

Thus, the display unit and the tray assembly of the stand are fully supported by the four small pinions, and as the gear segments rotate when the display unit is tilted the small pinions are rotated due to their engagement with the gear segments. As the radius of curvature of the segments is centered on the horizontal line through a point at or near the center of gravity of the tilted elements, that is, the display unit and the tray assembly, movement of the center of gravity is minimised. Accordingly, the tilted elements remain substantially in balance whatever the angle of tilt, at least within the limits essentially defined by the lengths of the gear segments. Expressed differently, as the elements are tilted, they pivot about the line at or near the center of gravity and there is no substantial forward or rearward weight transference. Accordingly, if the line either passes through, or very close to, the center of gravity, the system will work adequately with only the four small pinions rotatable on their respective axles and without the larger co-axial pinions (e.g. 14 and 16) and central pinions (e.g. 12). However, with such an arrangement, and when the small pinions are freely rotatable, there is the possibility of unwanted tilting movement of the CRT display device in response, for example, to slight vibration of the stand. To prevent this unwanted movement by adding static rest pressure and in addition to minimise backlash when the tilt is deliberately changed, the small support pinions are coupled together by means of the large central pinion. In practice these small pinions may engage the central pinion directly without the use of the larger co-axial pinions, e.g. 14 and 16. The purpose of these larger co-axial pinions is to limit sideways movement of segments 18 and 24 by means of the step between the smaller and longer co-axial pinions as shown in FIG. 2 and also to provide stop positions to limit the angle of tilt by engaging the under surface of floor 8 (FIG. 1) at both extremeties of the tilt.

Figure 4:
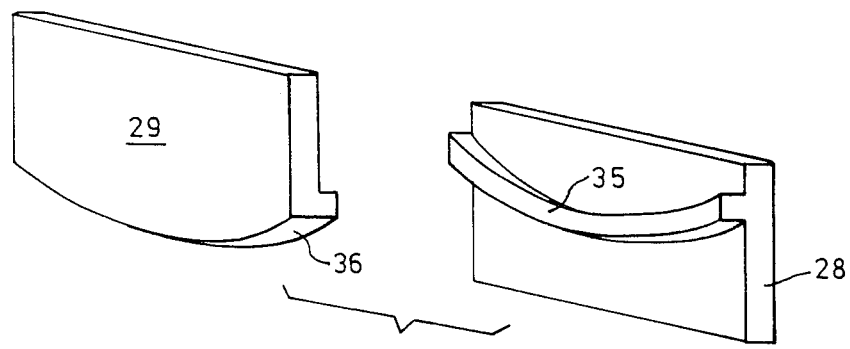
FIG. 4 shows details of a retaining mechanism associated with the tilt mechanism of FIGS. 1 and 2.

FIG. 4 shows details of a retaining mechanism designed to prevent the tray assembly coming apart from the base assembly during use. With the system thus far described the segments 18 and 24 rest on the four small pinions and, therefore, if the CRT display device is knocked the tray assembly could become mis-aligned or even completely disengaged. In addition, if an attempt is made to carry the whole assembly by means of the tray, only the tray and CRT display device would be lifted, leaving the base assembly behind. Accordingly, as shown in FIGS. 2 and 4, a curved guide member 35, 37 is attached to the outer surface of each of the support plates 28 and 12 respectively. This may either be a projection molded into the support plate as shown in FIG. 4, or a separate element which is firmly affixed to the support plate. Retaining plates 29 and 30 are attached to the undersurface of floor 8 (FIG. 1) in the positions shown in FIG. 2. These plates include retaining projections 36 and 38 which are shaped to co-operate with the curved guide members 35 and 37. In normal use, the guide members and retaining projections do not contact one another. They are, however, spaced vertically a sufficient distance to prevent disengagement of the segments from the small pinions on upward movement of the tray assembly from the base assembly.

In order to permit swivelling movement of the CRT display device, upper base plate 22, which is circular, is mounted on a lower base plate 23 and maintained there by a central pin (not shown) to allow the upper base plate to rotate on the lower base plate. In order to provide easy swivelling movement a Teflon (Registered Trade Mark) disk is sandwiched between the lower surface of the upper base plate and the upper surface of the lower base plate. Alternatively, a ring of this material may be inserted in a groove in the lower base plate to separate these plates and thereby provide smooth movement.

Though it might at first sight be thought that, in view of the relationship between the center of gravity of the CRT display device and segments 18 and 24, a stand with given dimensions would be suitable for only one design of CRT display device, this has been found not to be the case in practice. This is because, with light weight molded cabinets now in use, the center of gravity of the display device is determined almost entirely by the dimensions of the tube. Thus, it has been found that, for example, the stand can accommodate a monochrome or color display device with the same screen size. The effect of any slight variations in the position of the center of gravity are negated by the pinion coupling arrangement, which, as has been explained above, provides a rest pressure which prevents unwanted tilting movement.

While the described stand includes an upper tray assembly into which the CRT display device fits, it is clear that the segments and skirts may actually be formed on the base of the display device itself. This, of course, would result in considerable cost reduction.

Furthermore, with suitable design of the skirts, a purchaser would then have the choice of a final configuration in which the device stands on the skirts, or a tilting configuration as shown.

Manufacture of the stand can be made simple and, therefore, inexpensive. The upper tray portion, including the skirts, gear segments and retaining plates can be molded in one piece. The upper base plate and support plates may also be molded in one piece. The remaining components are the pinion axles, the pinions themselves (of which the co-axial pinions can also be one piece moldings), the lower base plate and the base plate separating disc or rod. All the assembly may be achieved by robot techniques except perhaps the final assembly of the upper tray portion to the base plate assembly. This requires the tray assembly to be guided round the retaining mechanism and on to the small pinions along a curved path defined by the retaining mechanism elements.

While the invention has been described with reference to a particular embodiment, it will be understood by those skilled in the art that various modifications in form and detail may be made without departing from the spirit and scope of the invention.

We claim:

1. A tiltable cathode ray tube display device structure comprising:
   (a) an assembly, including said display device, tiltable about a line passing through at near the center of gravity of the assembly, said assembly including a pair of spaced gear segment mounted to extend below the assembly, each segment having a radius of curvature centered on said line;
   (b) a base number carrying two pairs of support pinions, each pair of support pinions being mounted to engage and support a corresponding one of said gear segments; and
   (c) mounted on the base member, two idler pinions, each intercoupling the pinions of an associated pair of the support pinions and arranged to permit free rotation of the associated pair of support pinions during tilting movement of the assembly in response to tilting force applied to the assembly, and to apply static rest pressure to the associated pair of support pinions to resist tilting movement of the assembly when at rest.

2. A display device structure according to claim 1 wherein the support pinions in each pair are coupled to the corresponding idler pinion through a further pair of pinions, each of which is co-axial with, larger in diameter than, and fixed for rotation with, a corresponding pinion in the pair of support pinions, said further pair of pinions being in engagement with said corrresponding idler pinion.

3. A display device structure according to claim 1, wherein said assembly includes a tray carrying said gear segments and adapted to support said display device.

4. A display device structure according to claim 2, wherein said assembly includes a tray carrying said gear segments and adapted to support said display device.

* * * * *